(12) United States Patent
Kim et al.

(10) Patent No.: US 8,970,529 B2
(45) Date of Patent: Mar. 3, 2015

(54) TOUCH SENSOR PANEL USING OSCILLATION FREQUENCY

(71) Applicant: Interflex Co., Ltd., Gyeonggi-do (KR)

(72) Inventors: Jai-Kyung Kim, Gyeonggi-do (KR); Kwang-Sik Lee, Gyeonggi-do (KR)

(73) Assignee: Interflex Co., Ltd., Gyeonggi-Do (KR)

( * ) Notice: Subject to any disclaimer, the term of this patent is extended or adjusted under 35 U.S.C. 154(b) by 161 days.

(21) Appl. No.: 13/717,838

(22) Filed: Dec. 18, 2012

(65) Prior Publication Data
US 2013/0162565 A1  Jun. 27, 2013

(30) Foreign Application Priority Data
Dec. 21, 2011  (KR) .................. 10-2011-0138754

(51) Int. Cl.
*G06F 3/041* (2006.01)
*G06F 3/044* (2006.01)

(52) U.S. Cl.
CPC .............. *G06F 3/041* (2013.01); *G06F 3/0416* (2013.01); *G06F 3/044* (2013.01)
USPC ........................................................ 345/173

(58) Field of Classification Search
USPC ............ 345/173–174, 177; 178/18.01–18.07, 178/18.09
See application file for complete search history.

(56) References Cited

U.S. PATENT DOCUMENTS

| | | | |
|---|---|---|---|
| 4,205,199 A * | 5/1980 | Mochizuki ................. | 178/18.03 |
| 6,469,687 B1 * | 10/2002 | Janssen ............................ | 345/94 |
| 2008/0018608 A1 * | 1/2008 | Serban et al. ................. | 345/173 |
| 2008/0136787 A1 * | 6/2008 | Yeh et al. ....................... | 345/173 |
| 2008/0252608 A1 * | 10/2008 | Geaghan ....................... | 345/173 |
| 2010/0309167 A1 * | 12/2010 | Nam ............................. | 345/174 |
| 2012/0133614 A1 * | 5/2012 | Bytheway et al. ............ | 345/174 |

* cited by examiner

*Primary Examiner* — Rodney Amadiz
(74) *Attorney, Agent, or Firm* — Rabin & Berdo, P.C.

(57) ABSTRACT

Disclosed are a device and a method of sensing a touch using an oscillation circuit. Touch sensor lines that detect a position by using a resistor and a capacitor of an RC oscillation circuit face each other to make pairs in a panel, and an oscillation frequency generated according to capacitance of the panel which is changed by a touch is measured through the adjacent touch sensor lines and two or more characteristics of the measured oscillation frequency are calculated to determine the touched position.

16 Claims, 10 Drawing Sheets

TOUCH SENSOR PANEL USING OSCILLATION FREQUENCY

CROSS-REFERENCE TO RELATED APPLICATION

This application is based on and claims priority under 35 U.S.C. §119 to Korean Patent Application No. 10-2011-0138754, filed on Dec. 21, 2011, in the Korean Intellectual Property Office, the disclosure of which is incorporated herein in its entirety by reference.

TECHNICAL FIELD

The present disclosure relates to a touch sensor panel, and more particularly, to a device and a method for detecting a change of an oscillation frequency of a circuit generated when a touch is performed and determining a touched position.

BACKGROUND

Recently, with the development of portable devices, smart phones, tablet computers, game machines, study assistance devices, and cameras have been widely used, and an input type of the devices has been developed from an existing mouse or keyboard to a touch type. Since the input type using a touch can directly select and control icons or programs on a screen while a user watches the screen, there are advantages in that the device may be decreased in size and reduced in weight and simultaneously, an intuitive use method is provided to a user.

A resistive type and a capacitive type have been the most widely used as the touch sensing type. Among the types, recently, the use range of a capacitive touch panel having a simplified configuration and high operational reliability has been most rapidly increased.

FIG. 1 is a configuration diagram of a capacitive touch panel in the related art. A touch sensor 10 has a structure in which a touch electrode 31, 32 is installed on a substrate 11, the touch electrode has a diamond shape, a driver electrode 31 and a sensor electrode 32 are positioned to cross each other, and an insulating layer 33 is formed between the driver electrode 31 and the sensor electrode 32. The electrodes are horizontally or vertically connected to each other and connected with an external driver circuit through a terminal part 22 and a signal line 20.

In order to determine a position where a human body touches, a predetermined signal is scanned to the driver electrode and the signal is transferred though capacitance formed between the electrodes. When the human body touches or is close to the touch sensor, a capacitance value formed between the electrodes is changed and thus the signal transferred between the electrodes is changed due to the capacitance value change. The position where the human body touches may be detected by detecting the change of the signal transferred to the sensor electrode, and a position touched on a 2D coordinate may be determined by comparing a time of applying a scanning signal with the detected electrode.

FIG. 2 schematically illustrates an operational principle of a capacitive touch sensor in the related art. As illustrated in FIG. 2, a circuit device connected to the driver electrode transmits a signal (mainly, a pulse signal) having a predetermined shape to the sensor electrode. Since the capacitance structurally formed between the two electrodes exists, an AC component of the pulse signal applied through the driver electrode may be transferred from the driver electrode to the sensor electrode. A value of the signal transferred without the touch of the human body is set as a reference point. When the human body touches while the signal is transferred through the driver electrode, the capacitance value between the driver electrode and the sensor electrode is changed. Since the human body operates as a load having capacitance, the signal detected from the sensor electrode is changed. When the change amount is detected, it may be determined whether the human body touches. The method is a principle of a structure of a general capacitive touch sensor.

FIG. 3A is an enlarged diagram of an A part of the capacitive touch sensor in FID. 1. FIG. 3B is a diagram schematically illustrating a cross section of a I-II section in FIG. 3A. Referring to FIG. 3A, a driver electrode 31 is configured as a transparent electrode by using ITO and crosses a sensor electrode 32. Two electrodes are positioned on different layers and a dielectric layer 33 of FIG. 3B is disposed between the two layers, and as a result, the two electrode layers are not short-circuited to each other.

In the structure, at least three layers including the insulating layer are required because a conductive electrode layer is stereoscopically configured with two layers. The more layers of the touch sensor mean the more number of processes in a manufacturing process. Further, since two electrode layers are not overlapped with each other on a vertical line with the insulating layer interposed there between, when an upper electrode and a lower electrode are manufactured, the upper electrode and the lower electrode need to be precisely aligned with each other in the manufacturing process. If an overlapping phenomenon occurs between the electrode layers, an electric problem does not occur, but when an image is transmitted only at the overlapped portion, transmittance is decreased, and as a result, a phenomenon such as spots occurs on the screen.

SUMMARY

The present disclosure has been made in an effort to provide a structure of a touch sensor having a low price and a simplified configuration by using a single layer, and a position detecting device connected with the structure and a position detecting method.

An exemplary embodiment of the present disclosure provides a touch sensor panel, including: a substrate; a plurality of first sensor lines formed on the substrate in one direction; a plurality of second sensor lines spaced apart from the first sensor lines and formed between the first sensor lines; an oscillation circuit connected to the first sensor lines and the second sensor lines; a first signal line connecting the first sensor lines and the oscillation circuit; a second signal line connecting the second sensor lines and the oscillation circuit; first signal connection points connecting the first signal line and the first sensor lines; and second signal connection point connecting the second signal line and the second sensor lines, in which an extending direction of the first sensor line from the first signal connection point is opposite to an extending direction of the second sensor line from the second signal connection point.

The touch sensor may sense a change of capacitance.

The capacitance may be capacitance between the first sensor line or the second sensor line and a touch sensing object.

The capacitance may be changed when the touch means is close to or touches the panel, and a signal output from the oscillation circuit may be changed by interworking with the change of the capacitance.

The oscillation circuit may be connected with any one of the first sensor line and the second sensor line with an interval to output a signal.

The touch sensor panel may further include a detecting means connected to the oscillation circuit to detect the signal output from the oscillation circuit.

The detecting means may store and compare characteristics of an output signal when the oscillation circuit is connected to the first sensor line and an output signal when the oscillation circuit is connected to the second sensor line.

The first sensor line, the second sensor lines, the first signal line, and the second signal line may be positioned on the same surface of the substrate.

The substrate may be made of any one of a polymer film, plastic, and glass.

The first sensor line and the second sensor line may be made of a material containing transparent conductive oxide (TCO).

The transparent conductive oxide may contain any one of ITO, IZO, ATO, AZO, and ZnO.

The first sensor line and the second sensor line may have strip line shapes.

The first sensor line and the second sensor line may have engaged sawteeth shapes.

Widths of the first sensor line and the second sensor line may be in the range of 0.1 mm to 2 mm, respectively.

According to the exemplary embodiment of the present disclosure, since a touch position of a human body is determined through a plurality of sensor lines positioned in parallel to each other, a touch sensor having a simplified structure and configured by a single layer may be implemented and the number of processes required for manufacturing may be reduced. It is possible to provide a touch panel minimizing a side bezel other than a sensor area by simplifying wirings of the touch panel to minimize signal lines positioned outside.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
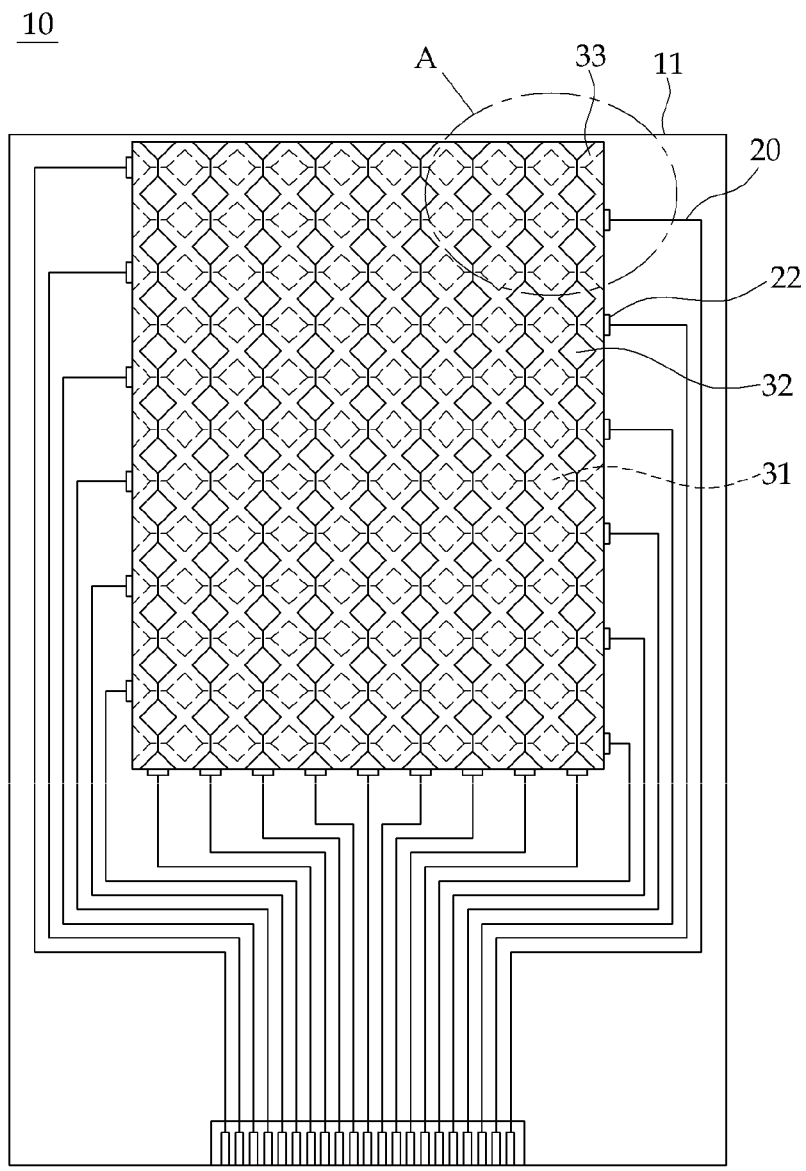
FIG. 1 is a diagram for describing a capacitive touch panel in the related art.
Figure 2:
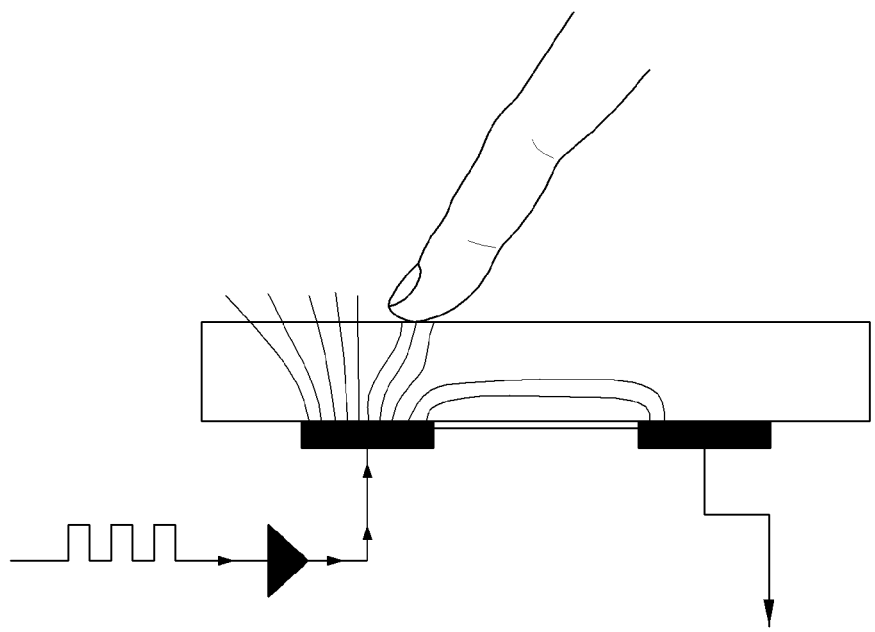
FIG. 2 is a diagram for describing an operation of the capacitive touch panel in the related art.
Figure 3A:
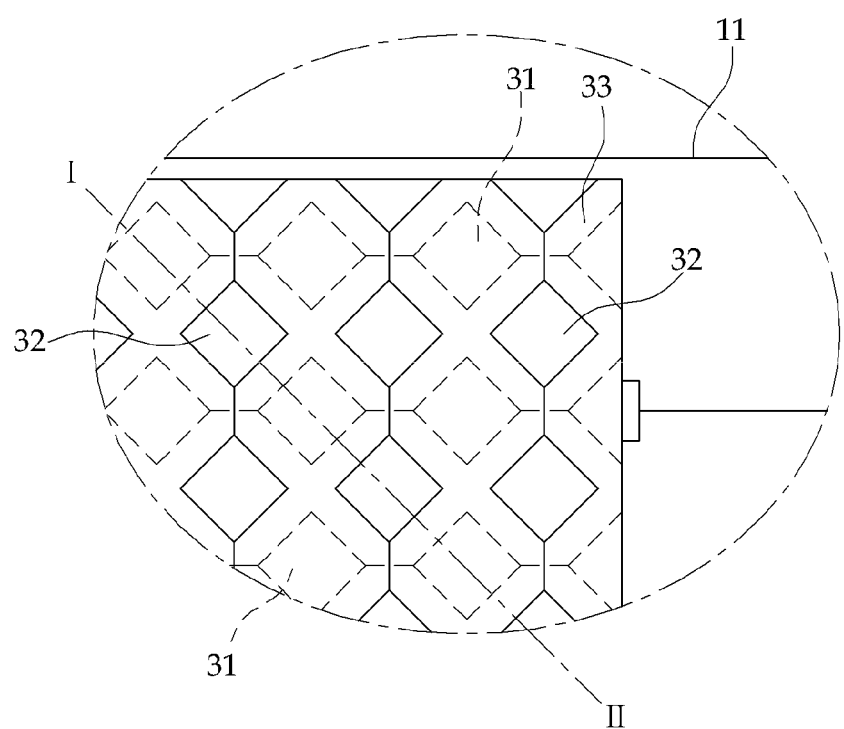
FIG. 3A and FIG. 3B are, respectively, an enlarged view and a cross-sectional view of the capacitive touch panel in the related art.
Figure 3B:
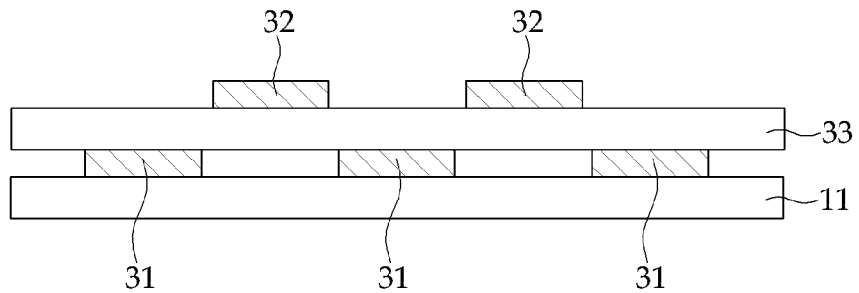

Hereinafter, exemplary embodiments of the present disclosure will be described in more detail with reference to the accompanying drawings. The scope of the present disclosure is not limited to the exemplary embodiments to be described below and the accompanying drawings. Exemplary embodiments to be described below and illustrated in the drawings may include various equivalences and modifications.

A touch sensor panel of the present disclosure uses a method of detecting a position by using an oscillation phenomenon through a resistance and a capacitance unlike a touch panel using a capacitance measuring principle of measuring a signal transmission change in the related art, and as a result, each sensor line may individually detect a position regardless of other sensor lines. However, when the position is measured by using the sensor lines designed in one direction, precision of the detected position rapidly deteriorates according to a measuring environment and thus it is difficult to determine an absolute touch point. The present disclosure solves the deterioration by combining two or more sensor lines disposed in parallel to each other.

Hereinafter, exemplary embodiments of the present disclosure will be described in detail with reference to the accompanying drawings.

Figure 4:
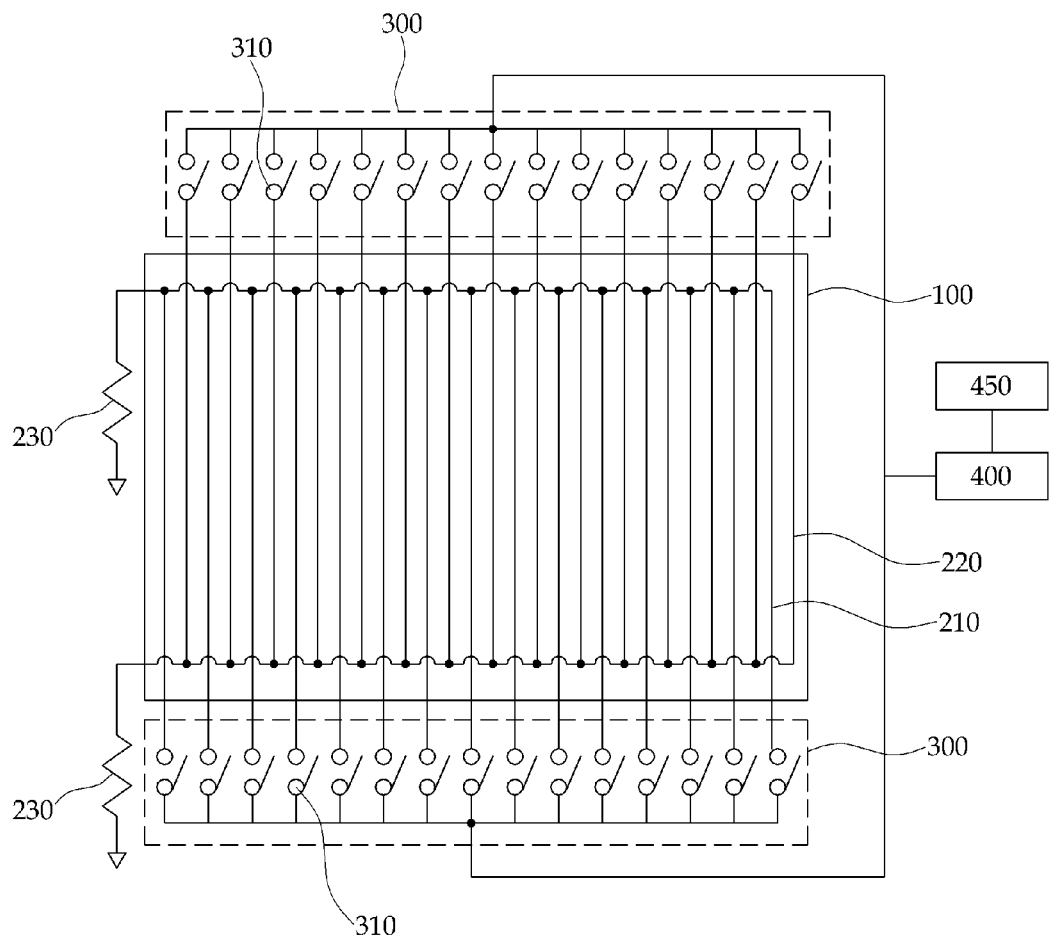
FIG. 4 is a diagram for describing a touch panel according to an exemplary embodiment of the present disclosure.

FIG. 4 illustrates a first exemplary embodiment of the present disclosure. In FIG. 4, a touch sensor panel includes first sensor lines 210 arranged in one direction on a substrate 100 and second sensor lines 220 positioned parallel to the first sensor lines. The sensor lines are connected with a circuit part through signal lines, and the signal lines are respectively connected with switches 310. One terminal of each switch 310 of the switch part 300 is connected with the sensor line through the signal line, and the other terminal is connected in common with an oscillation circuit 400. The first sensor lines 210 are connected with the oscillation circuit 400 through a lower terminal of the touch sensor, while the second sensor lines 220 are connected with the oscillation circuit 400 through an upper terminal of the touch sensor. In the exemplary embodiment of the present disclosure, a touch position is determined by at least two pairs of first and second sensor lines connected with the oscillation circuit 400 through both sides. In a waveform output while being connected with the sensor lines, characteristics such as a cycle and a frequency of the waveform are detected and stored through a calculator 450, and then compared with each other. Oscillation waveforms when connecting two or more sensor lines are analyzed through a comparison process of the calculator to determine a touched position. The oscillation waveform may be corrected so as not to depend on an absolute value of a capacitance of the touched human body and an ambient environment by using the two or more pairs of sensor lines to determine a precise position.

An external resistance 230 of FIG. 4 is a common resistance positioned at the last terminal of each sensor line. The external resistance 230 is not necessarily an essential constituent element, and is not required to be connected when a self-resistance of the sensor line is sufficiently large. The external resistance 230 serves to position a frequency having the oscillation waveform within a predetermined range by installing a resistance having a resistance value of about several KΩ to several MΩ at an opposite side to a connection point of the signal line.

Figure 5:
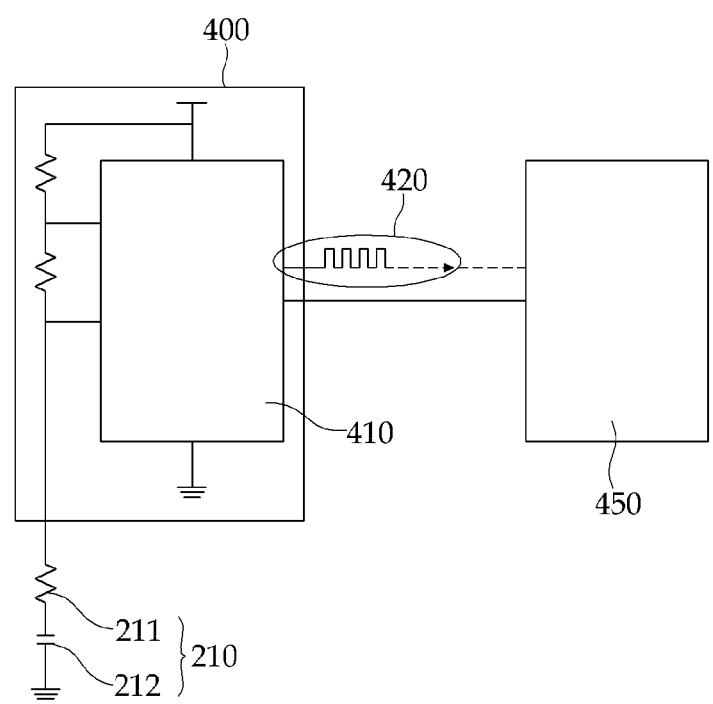
FIG. 5 is a diagram for describing a configuration of an oscillation circuit according to the exemplary embodiment of the present disclosure.

FIG. 5 illustrates a basic principle of sensing a position by using a touch sensor structure of the present disclosure. The oscillation circuit 400 is connected with the sensor line 210 through the signal line. Since the self resistance 211 and a capacitance 212 are included in the sensor line 210, a pulse waveform 420 is output to an output terminal of the oscillation circuit 400 as illustrated in FIG. 5 and an output waveform is used by inputting of the calculator 450. However, the resistance 211 and the capacitance 212 which are factors for determining a frequency or a cycle value of the oscillated pulse have different values according to a touch position of the human body. For example, since a distance of the touch position is decreased when the touch position is close to the signal connection point where the signal line and the sensor line are connected, the resistance value is slightly changed and the capacitance value is increased by a predetermined amount. However, when the touch position of the human body is far away from the signal connection point, the resistance value connected with the oscillation circuit is increased and the capacitance value is increased. As a result, the cycle of the oscillated pulse is increased and thus the frequency is lowered. That is, as the point which is far away from the signal connection point is touched, the cycle of the output wave of the oscillation circuit is increased.

Figure 6A:
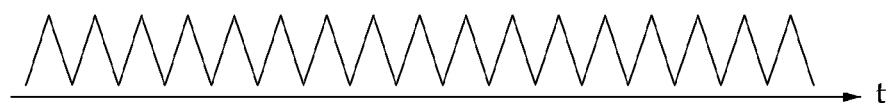
FIG. 6A, FIG. 6B and FIG. 6C, respectively, are a diagram for describing an oscillation waveform according to the exemplary embodiment of the present disclosure.

A frequency of FIG. 6A is a form of a waveform output when the human body touches a close point. The capacitance of the sensor line is increased, but a distance from the connection part of the oscillation circuit part is not far, the resistance value is small.

Figure 6B:
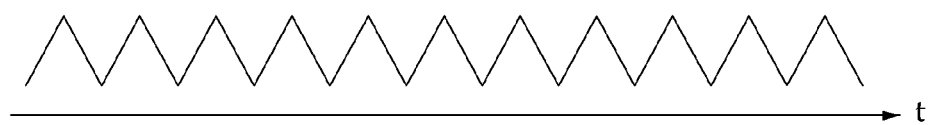

FIG. 6B is a waveform output when the human body touches a middle point. The resistance value is somewhat increased and the capacitance value is also increased.

Figure 6C:
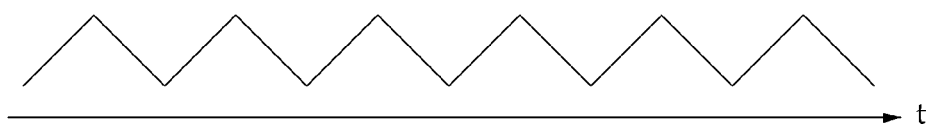

FIG. 6C is a waveform output when the human body touches the farthest point from the signal connection point. Since the resistance value is increased up to the touch point of the human body, the cycle of the waveform is the largest even though the touch point is touched with the same capacitance.

In FIGS. 5 and 6, the oscillation frequency when the oscillation circuit is connected with the sensor line where the human body touches may be represented by the following Formula.

$$F(\text{frequency}) = \alpha / \{R(\text{resistance up to touch point}) * [Ch(\text{human capacitance}) + Cs: \text{parasitic capacitance of sensor line})]\}$$

Since a detection frequency F is inversely proportional to the resistance and the capacitance, the entire capacitance value is increased and thus the oscillation frequency F is decreased.

However, when the touch position is determined by only the frequency F, the capacitance value generated by the human body is changed every time by an ambient environment during touching and thus it is difficult to accurately determine the touch position. The present disclosure uses a method of calculating an oscillation frequency measured by the first sensor line and the second sensor line to correct a change of the frequency due to the environment during touching. When the touch position of the two sensor lines is detected from both sides, an effect influenced by an absolute capacitance value is removed and the touch position may be relatively determined.

The following Table 1 illustrates measurement values of a first frequency measured by touching each position dividing an electrode into nine parts when the first sensor line is connected with the oscillation circuit and a second frequency measured by touching the same point of the electrode when the second sensor line is connected with the oscillation circuit. Table 2 is a result measured in a state where the ambient environment is changed by the same method as Table 1. In the case of determining the position by comparing two electrode pairs, since a relative position of the touch position is determined by calculation, an error that may be generated when the touch position is determined through a single electrode by using the absolute value may be reduced.

TABLE 1

| Measurement position | First frequency | Second frequency | Difference value | Ratio value |
| --- | --- | --- | --- | --- |
| 1 | 54.3 | 59.9 | −5.6 | 0.907 |
| 2 | 54.8 | 59.1 | −4.3 | 0.927 |
| 3 | 55.3 | 58.6 | −3.3 | 0.944 |
| 4 | 56.5 | 58.1 | −1.6 | 0.972 |
| 5 | 57.4 | 57.2 | 0.2 | 1.003 |
| 6 | 579 | 56 | 523 | 10.339 |
| 7 | 58.7 | 55.3 | 3.4 | 1.061 |
| 8 | 59.2 | 53.8 | 5.4 | 1.100 |
| 9 | 59.6 | 51.8 | 7.8 | 1.151 |

TABLE 2

| Measurement position | First frequency | Second frequency | Difference value | Ratio value |
| --- | --- | --- | --- | --- |
| 1 | 53.9 | 59.9 | −6 | 0.900 |
| 2 | 54.5 | 59.1 | −4.6 | 0.922 |
| 3 | 55.6 | 58.4 | −2.8 | 0.952 |
| 4 | 56.6 | 57.8 | −1.2 | 0.979 |
| 5 | 57.4 | 57.3 | 0.1 | 1.002 |
| 6 | 58.3 | 56 | 2.3 | 1.041 |
| 7 | 59 | 54.9 | 4.1 | 1.075 |
| 8 | 59.2 | 53.3 | 5.9 | 1.111 |
| 9 | 59.8 | 52 | 7.8 | 1.150 |

Figure 7:
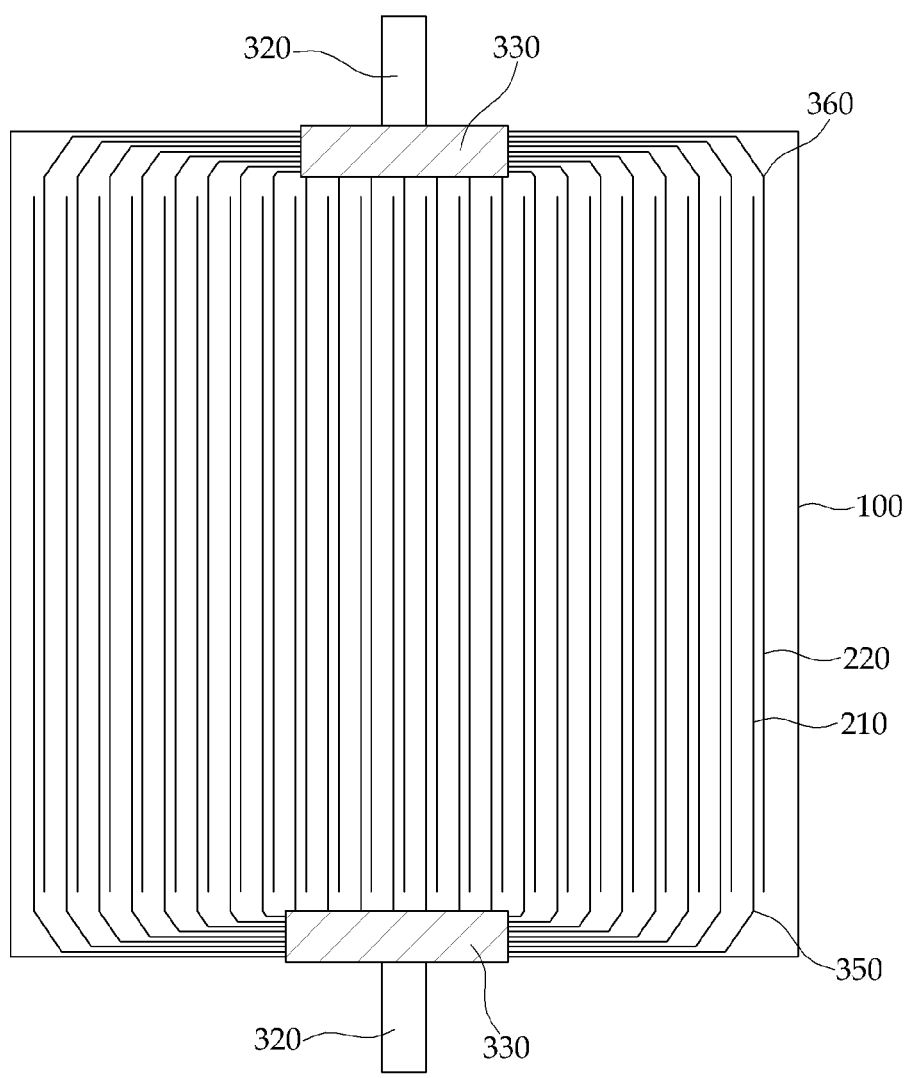
FIG. 7 is a configuration diagram of a touch panel of Example 1 of the present disclosure.

FIG. 7 is a diagram illustrating a configuration connected to the substrate as an exemplary embodiment of the present disclosure. As a first exemplary embodiment of the present disclosure, the first sensor line and the second sensor line are parallel to each other, and respective signal connection points and interface parts are positioned at the opposite side of the substrate. In FIG. 7, respective terminal parts connected with an FPC are disposed in an upper direction and a lower direction of the substrate of the touch panel. Accordingly, the touch panel without a side bezel may be configured by minimizing electrode wirings in the panel and removing signal connection wirings disposed at left and right outer sides of the panel. As a screen size of a mobile apparatus becomes large, it is required that a size of the mobile apparatus is minimized while the screen is increased. To this end, a screen display device of the mobile apparatus is manufactured by minimizing an outermost side. On the contrary, since the touch panel includes a signal line wiring required for an electrode in a horizontal direction from the side, it is difficult to reduce the side bezel. The present disclosure implements a touch panel for a mobile apparatus having a narrow side as a structure in which the signal wiring does not need to be disposed at the side. In FIG. 7, the first sensor lines 210 and the second sensor lines 220 extend in opposite directions to each other to be alternated in parallel to each other. The signal line applying a signal to each sensor line connects the oscillation circuit 400 and the sensor lines 210 and 220 which are positioned outside through the FPC 320 and the terminal part 330. The first sensor line is connected with the signal line through a first signal connection point 350, and the second sensor line is connected with the signal line through a second signal connection point 360. The signal line, the sensor line, and the signal connection point described in the present disclosure are used to describe in detail the structure of the touch panel of the present disclosure and thus do not mean that connection points using a separate device or material exist. The signal line, the sensor line, and the signal connection point may be formed by the same material for convenience of manufacturing if possible. Particularly, in the case where the touch panel is used as a transmissive type, an oxide electrode made of a transparent material may be used. As transparent conductive oxide, ITO is frequently used, but various transparent conductive materials such as AZO, IZO, and ZnO may be used.

Figure 8A:
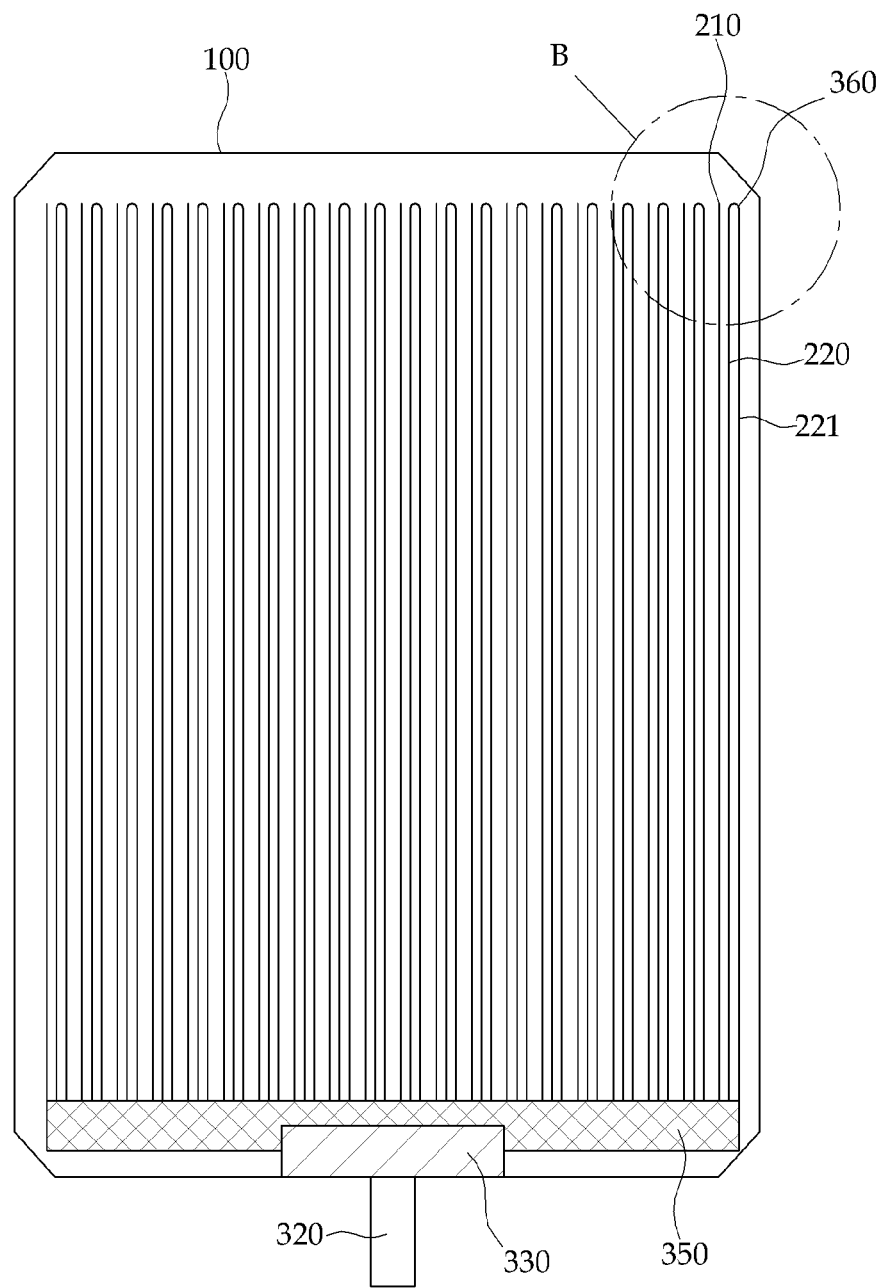
FIG. 8A is a configuration diagram of a touch panel of Example 2 of the present disclosure.

FIG. 8A is a second exemplary embodiment of the present disclosure, and the first sensor line 210 is connected with the circuit part through the first signal connection point 350 positioned below the touch panel, and the second sensor line 220 is connected with the circuit part through the second signal connection point 360 positioned above the touch panel. The second signal connection point 360 serves to connect the second sensor line 220 and the second signal line 221. The first signal connection point 350 and the second signal connection point 360 are positioned at both ends with the sensor lines 210 and 220 interposed therebetween. The touch panel of FIG. 8A has advantages of facilitating a manufacturing process and simplifying connection with a display positioned on the rear side of the touch panel because an interface through the FPC is positioned only at one side of the substrate. However, since the resistance values connected with the first sensor line and the second sensor line are different from each other, correction required for the different resistance values needs to be performed in the calculator.

Figure 8B:
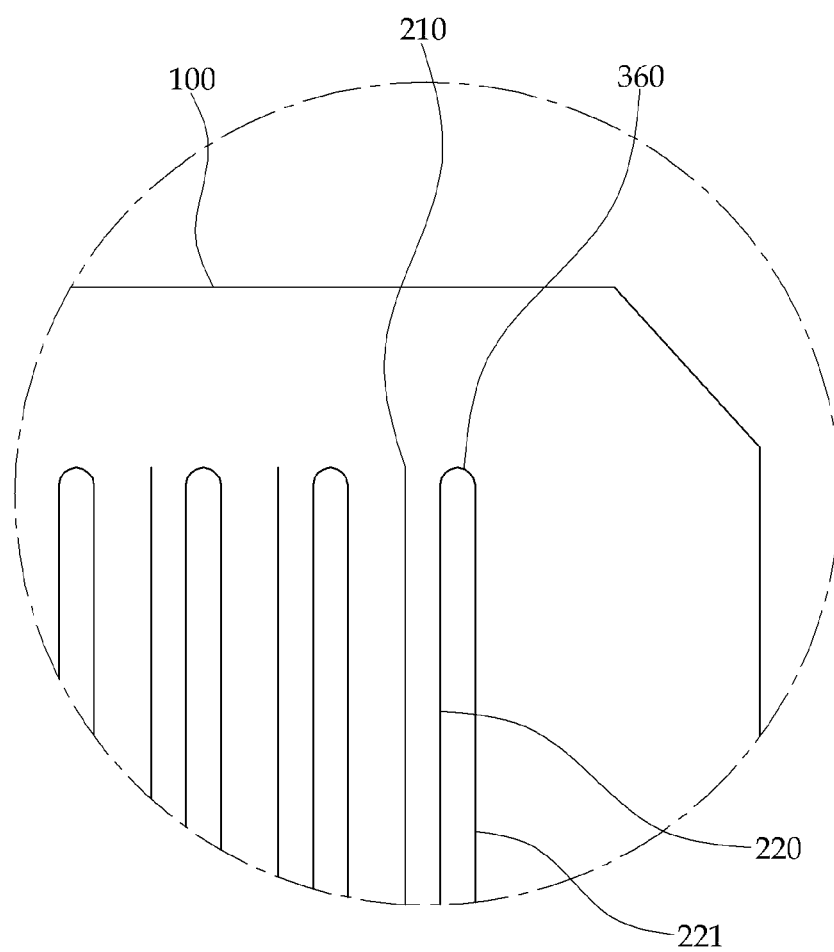
FIG. 8B is an enlarged diagram of a B part of the touch panel in FIG. 8A.

FIG. 8B is an enlarged diagram of a B part of the touch panel in FIG. 8A. In the second exemplary embodiment of the present disclosure, the terminal part is not installed at the upper side. Accordingly, the signal line 221 extends in parallel to the sensor line 220 to be connected with the sensor line 220 through the signal connection point 360. The signal line 221 and the sensor line 220 have different widths and the signal line 221 has the smaller width so as not to prevent the sensor line 220 from detecting the touch.

FIG. 9 is a diagram illustrating shapes of the sensor lines used in the present disclosure.

Figure 9A:
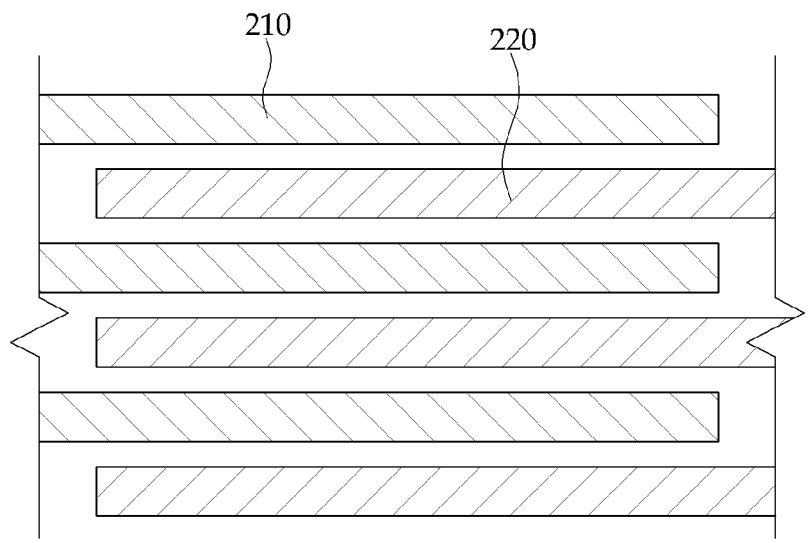
FIG. 9A, FIG. 9B and FIG. 9C are, respectively, a shape diagram of a sensor line used in the exemplary embodiment of the present disclosure.

FIG. 9A illustrates sensor lines having strip line shapes. The sensor lines of the present disclosure serve to change a cycle of a frequency oscillated in the oscillation circuit through the capacitance by the touch of the human body and resistance values embedded in the sensor lines. In the structure of the capacitive touch sensor in the related art, the capacitance formed between two adjacent electrodes performs an important role, but the present disclosure has the structure in which the sensor lines respectively operate, and as a result, there are many differences in a layout or structure of the sensor lines. In FIG. 9A, the first sensor lines 210 and the second sensor lines 220 are disposed in parallel to each other. Since two sensor lines accurately have symmetry, the detected frequency is easy to be corrected and thus an accurate position may be detected. In order to detect touch of the human body through two sensor lines at the same time, a width of a pattern of the sensor line may be a minimum of 0.1 mm to a maximum of 2 mm. When the width is less than 0.1 mm, it is difficult to form the capacitance between a required touch object and the sensor line, and when the width is more than 2 mm, the touch of the human body may be detected only in any one line.

Figure 9B:
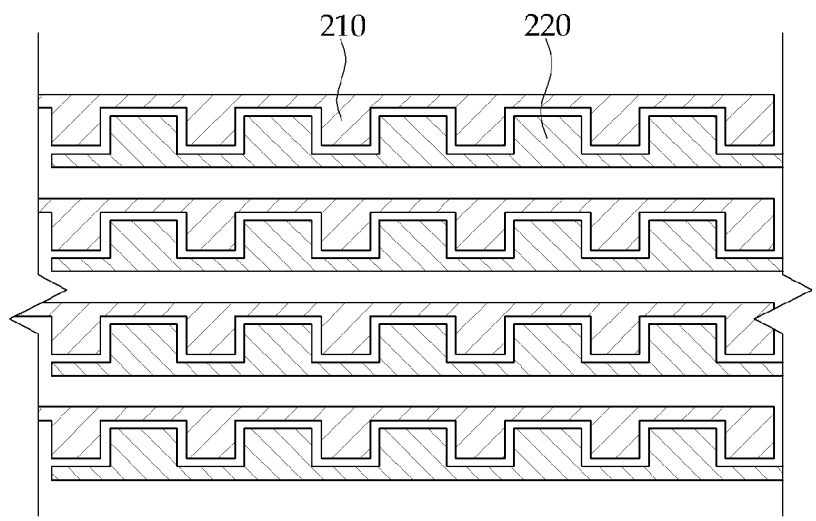

In FIG. 9B, in order to increase the resistance value while efficiently detecting the capacitance formed during the touch of the human body, the first sensor line and the second sensor line are formed to face each other as an uneven structure. A maximum width of the uneven structure does not need to exceed 2 mm so that the unevenness of at least a first sensor line and a second sensor line may detect the touch from the human body at the same time. When the unevenness of the sensor line is large, the detecting part due to the touch from the human body may occur only in any one of the first sensor line and the second sensor line and thus it may be difficult to determine the accurate position.

Figure 9C:
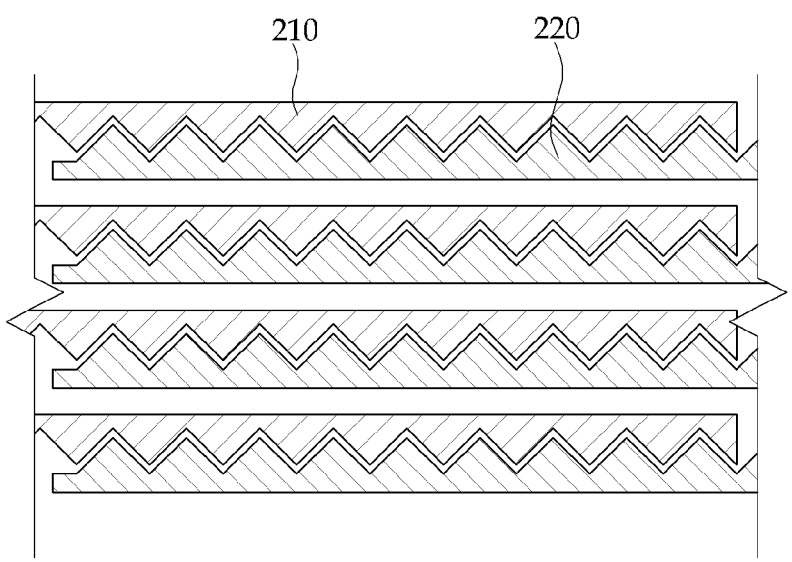

FIG. 9C is a shape of the sensor lines disposed to face each other by forming a shape of an unevenness in a triangle.

The structure of the sensor lines used in the present disclosure is not limited to the examples of FIGS. 9A, 9B, and 9C, and may use shapes of the sensor lines having various symmetric shapes.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A touch sensor panel, comprising:
a substrate;
a plurality of first sensor lines formed on the substrate in one direction, the first sensor lines having respective first signal connection points;
a plurality of second sensor lines spaced apart from the first sensor lines and formed between the first sensor lines, the second sensor lines having respective second signal connection points;
a first signal line;
a second signal line;
an oscillation circuit that is alternately connected to the first signal connection points of the first sensor lines via the first signal line and to the second signal connection points of the second sensor lines via the second signal line, the oscillation circuit generating first oscillation frequencies when connected to the first signal connection points and generating second oscillation frequencies when connected to the second signal connection points; and
a calculator connected to the oscillation circuit, and determining a touch position by comparing the first oscillation frequencies and the second oscillation frequencies,
wherein an extending direction of the first sensor lines from the first signal connection points is opposite to an extending direction of the second sensor lines from the second signal connection points.

2. The touch sensor panel of claim 1, wherein the touch sensor senses a change of capacitance.

3. The touch sensor panel of claim 2, wherein the capacitance is capacitance between at least one of the first sensor lines or at least one of the second sensor lines and an external touch means.

4. The touch sensor panel of claim 3, wherein the capacitance is changed when the touch means is close to or touches the panel, and a signal output from the oscillation circuit is changed by interworking with the change of the capacitance.

5. The touch sensor panel of claim 4, wherein the oscillation circuit is connected with any one of the first sensor lines and the second sensor lines with an interval to output a signal.

6. The touch sensor panel of claim 1, wherein the calculator stores and compares characteristics of an output signal when the oscillation circuit is connected to the first sensor lines and an output signal when the oscillation circuit is connected to the second sensor lines.

7. The touch sensor panel of claim 6, wherein the characteristics of the output signals are at least one of voltage, amplitude, a frequency, and a cycle.

8. The touch sensor panel of claim 1, wherein the first sensor lines, the second sensor lines, the first signal line, and the second signal line are positioned on the same surface of the substrate.

9. The touch sensor panel of claim 1, wherein the substrate is made of any one of a polymer film, plastic, and glass.

10. The touch sensor panel of claim 1, wherein the first sensor lines and the second sensor lines are made of a material containing transparent conductive oxide (TCO).

11. The touch sensor panel of claim 10, wherein the transparent conductive oxide contains any one of ITO, IZO, ATO, AZO, and ZnO.

12. The touch sensor panel of claim 1, wherein the first sensor lines and the second sensor lines have strip line shapes.

13. The touch sensor panel of claim 1, wherein the first sensor lines and the second sensor lines have engaged saw-teeth shapes.

14. The touch sensor panel of claim 1, wherein widths of the first sensor lines and the second sensor lines are in the range of 0.1 mm to 2 mm wide, respectively.

15. The touch sensor panel of claim 1, wherein the calculator determining the touch position by calculating the ratio of differences between the first oscillation frequencies and the second oscillation frequencies.

16. The touch sensor panel of claim 1, wherein the first oscillation frequencies and the second oscillation frequencies are obtained by using the following formula:

$$F=\alpha/\{R*[Ch+Cs]\}$$

where F is the first oscillation frequencies or the second oscillation frequencies, $\alpha$ is constant, R is resistance from the first signal connection points to the touch point or from the second signal connection points to the touch point, Ch is human capacitance, and Cs is parasitic capacitance of the sensor lines.

\* \* \* \* \*